(12) United States Patent
Sekiya

(10) Patent No.: US 9,042,739 B2
(45) Date of Patent: May 26, 2015

(54) NETWORK MANAGEMENT SYSTEM, REPEATER, AND REPEATING METHOD

(75) Inventor: Motoyoshi Sekiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 850 days.

(21) Appl. No.: 12/656,895

(22) Filed: Feb. 18, 2010

(65) Prior Publication Data

US 2010/0220998 A1 Sep. 2, 2010

Related U.S. Application Data

(63) Continuation of application No. PCT/JP2007/066581, filed on Aug. 27, 2007.

(51) Int. Cl.
*H04B 10/08* (2006.01)
*H04B 10/291* (2013.01)
*H04J 14/02* (2006.01)

(52) U.S. Cl.
CPC .......... *H04B 10/291* (2013.01); *H04J 14/0201* (2013.01); *H04J 14/0204* (2013.01); *H04J 14/0221* (2013.01); *H04J 14/0257* (2013.01); *H04J 14/026* (2013.01); *H04J 14/0275* (2013.01)

(58) Field of Classification Search
CPC ............... H04B 10/0775; H04B 10/07; H04B 10/0777; H04B 10/07955; H04B 10/0797
USPC ................................................. 398/172, 177
See application file for complete search history.

(56) References Cited

U.S. PATENT DOCUMENTS

| | | | | |
|---|---|---|---|---|
| 5,349,463 | A | * | 9/1994 | Hirohashi et al. ............. 398/126 |
| 6,016,212 | A | * | 1/2000 | Durant et al. ................. 398/131 |
| 6,466,348 | B1 | * | 10/2002 | Izumi ............................ 398/177 |
| 6,724,526 | B1 | | 4/2004 | Onaka et al. |
| 7,684,711 | B2 | * | 3/2010 | Desbruslais et al. .......... 398/181 |

(Continued)

FOREIGN PATENT DOCUMENTS

| | | |
|---|---|---|
| JP | 2001-103013 | 4/2001 |
| JP | 2002-112294 | 4/2002 |
| JP | 2005-65019 | 3/2005 |
| JP | 2006-86920 | 3/2006 |

OTHER PUBLICATIONS

K. Nakamura et al., "1.28 Tbit/s Transmission over 1680 km Standard SMF with 120 km Optical Repeater Spacing Employing Distributed Raman Amplification," OECC2000, PD1-7, Jul. 2000, pp. 14-15.

(Continued)

*Primary Examiner* — David Payne
*Assistant Examiner* — Tanya Motsinger
(74) *Attorney, Agent, or Firm* — Staas & Halsey LLP

(57) ABSTRACT

A repeater includes a reception part configured to receive an optical signal transmitted by wavelength division multiplexing from a preceding repeater in a path from a source to a destination; a determination part configured to determine the channel allocation of the signal received by the reception part by determining a bit rate and a modulation technique with respect to each of channels in the received signal; and a detection part configured to detect a prohibited channel not to be included in the optical signal to be transmitted from the repeater, based on the channel allocation and a predetermined criterion.

13 Claims, 12 Drawing Sheets

(56) References Cited

U.S. PATENT DOCUMENTS

| | | | |
|---|---|---|---|
| 2002/0159113 A1* | 10/2002 | Tokunaga | 359/110 |
| 2003/0002104 A1* | 1/2003 | Caroli et al. | 359/127 |
| 2003/0215233 A1* | 11/2003 | Tomofuji et al. | 398/41 |
| 2004/0086279 A1* | 5/2004 | Sakamoto et al. | 398/177 |
| 2005/0041975 A1 | 2/2005 | Nakamura et al. | |
| 2006/0062577 A1* | 3/2006 | Miura et al. | 398/82 |
| 2007/0201878 A1* | 8/2007 | Nakashima et al. | 398/177 |

OTHER PUBLICATIONS

H. Griesser et al., "Influence of Cross-Phase Modulation Induced Nonlinear Phase Noise on DQPSK Signals from Neighbouring OOK Channels," ECOC 2005 Proceedings—vol. 2, Paper Tu 1.2.2, Sep. 25-29, 2005, pp. 123-124.

International Search Report for PCT/JP2007/066581, mailed on Nov. 20, 2007.

* cited by examiner

FIG.1
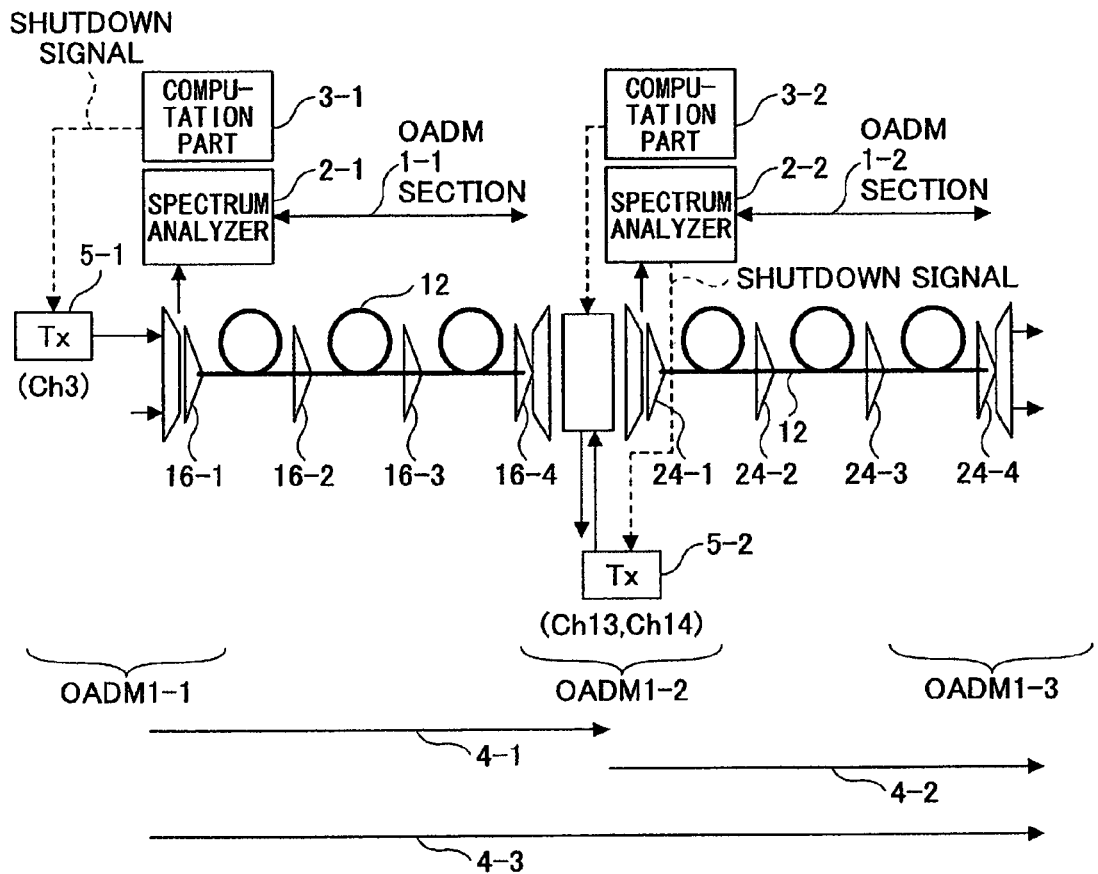
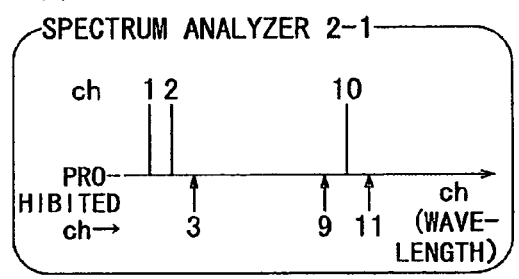
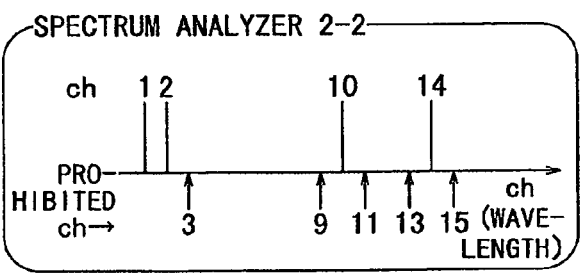

FIG.8
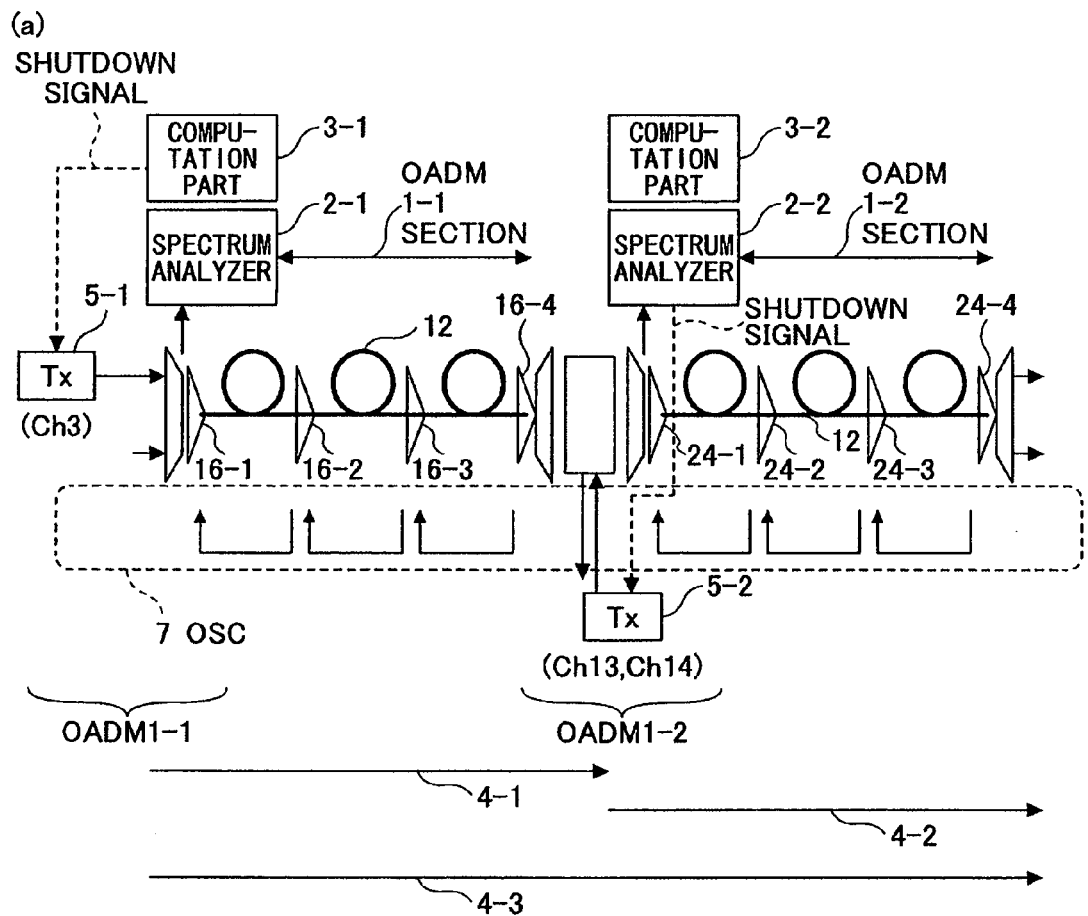
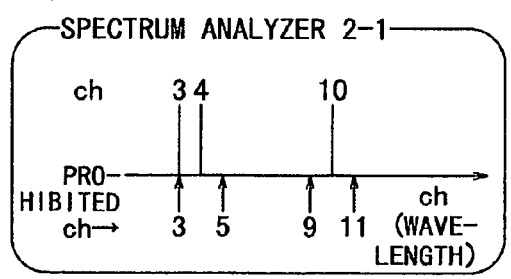
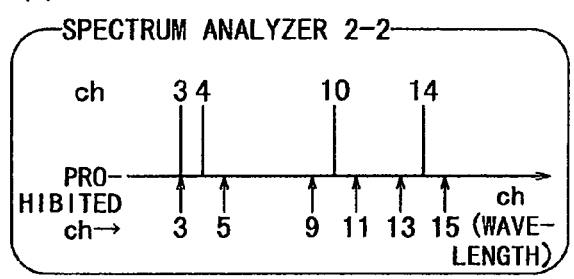

FIG.12
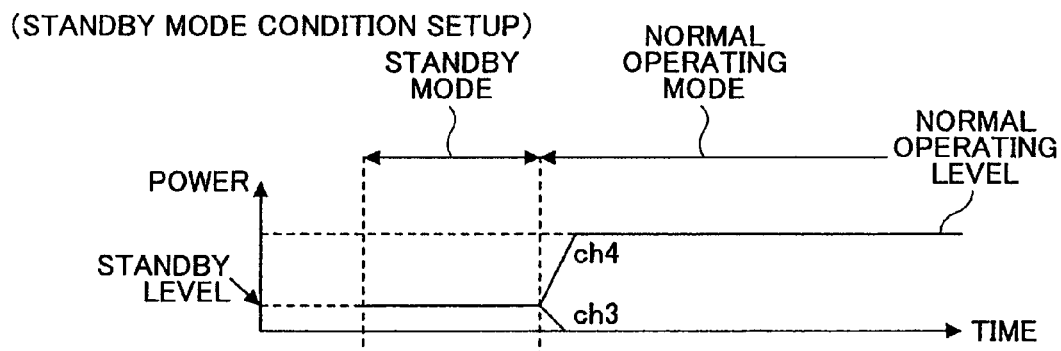
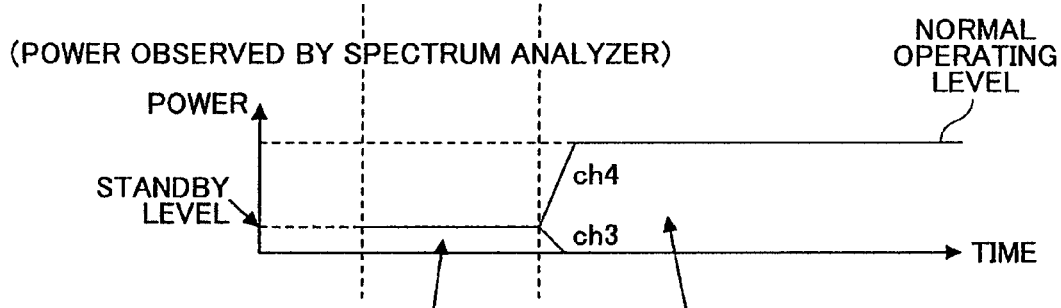
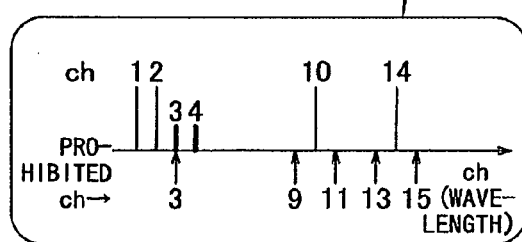
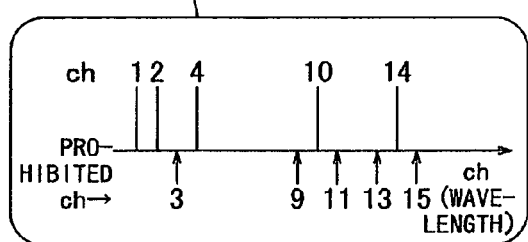

NETWORK MANAGEMENT SYSTEM, REPEATER, AND REPEATING METHOD

CROSS-REFERENCE TO RELATED APPLICATION

This application is a continuation application filed under 35 U.S.C. 111(a) claiming benefit under 35 U.S.C. 120 and 365(c) of PCT International Application No. PCT/JP2007/066581, filed on Aug. 27, 2007, the entire contents of which are incorporated herein by reference.

FIELD

A certain aspect of the embodiments discussed herein is related to a network management system, a relay, and a relay method.

BACKGROUND

In the technical field of optical communications, there are increasing demands for diversification of services and higher data transmission rates. In these years, wavelength multiplexing optical transmission systems of a transmission rate higher than 40 Gbps per wave are coming closer to realization. Unlike for optical signal transmission of around 10 Gbps, which is popular at present, no standard scheme has been determined for high-speed optical signal transmission as fast as 40 Gbps. In optical signal transmission of a transmission rate higher than or equal to 10 Gbps, not only is signal quality degraded by optical noise in optical amplifiers, but also optical signal characteristics are restricted by chromatic dispersion, non-linear effects, polarization mode dispersion, spectral narrowing by optical filters, etc., in transmission paths. Therefore, research and development have been promoted of modulation techniques with narrow spectral width that improve dispersion tolerance and non-linearity tolerance. In particular, in 40-Gbps wavelength multiplexing optical transmission systems, not only those using NRZ (Non-Return to Zero) but also those using modulation techniques such as CSRZ (Carrier-Suppressed Return to Zero), DPSK (Differential Phase Shift Keying), and DQPSK (Differential Quadrature Phase Shift Keying) have been proposed. Thus, systems using various modulation techniques are expected to be available in the future. For example, a 10-Gbps WDM (Wavelength Division Multiplexing) system, which is common at present, is described in K. Nakamura et al., "1.28 Tbit/s Transmission over 1680 km Standard SMF with 120 km Optical Repeater Spacing Employing Distributed Raman Amplification," OECC2000, PD1-7.

SUMMARY

According to an aspect of the invention, a repeater includes a reception part configured to receive an optical signal transmitted by wavelength division multiplexing from a preceding repeater in a path from a source to a destination; a determination part configured to determine a channel allocation of the signal received by the reception part by determining a bit rate and a modulation technique with respect to each of a plurality of channels in the received signal; and a detection part configured to detect a prohibited channel not to be included in the optical signal to be transmitted from the repeater, based on the channel allocation and a predetermined criterion.

According to an aspect of the invention, a network management system includes a control part configured to control operations of a plurality of repeaters; a determination part configured to determine a channel allocation with respect to each of the repeaters by determining a bit rate and a modulation technique with respect to each of a plurality of channels in an optical signal transmitted by wavelength division multiplexing and received by each of the repeaters; and a detection part configured to detect a prohibited channel not to be included in the optical signal to be transmitted from each of the repeaters, based on the channel allocation and a predetermined criterion.

According to an aspect of the invention, a method for repeating an optical signal transmitted by wavelength division multiplexing includes receiving an optical signal from a preceding first repeater by a second repeater in a path from a source to a destination; determining a channel allocation of the signal received by the second repeater by determining a bit rate and a modulation technique with respect to each of a plurality of channels in the received signal; and detecting a prohibited channel not to be included in the optical signal to be transmitted from the second repeater, based on the channel allocation and a predetermined criterion.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWING(S)

FIG. 1 is a diagram for illustrating an optical transmission system according to a first embodiment;

FIG. 8 is a diagram for illustrating an optical transmission system according to a second embodiment;

FIG. 12 is a diagram illustrating a relationship between a standby mode and a normal operating mode according to the sixth embodiment.

DESCRIPTION OF EMBODIMENTS

Figure 2:
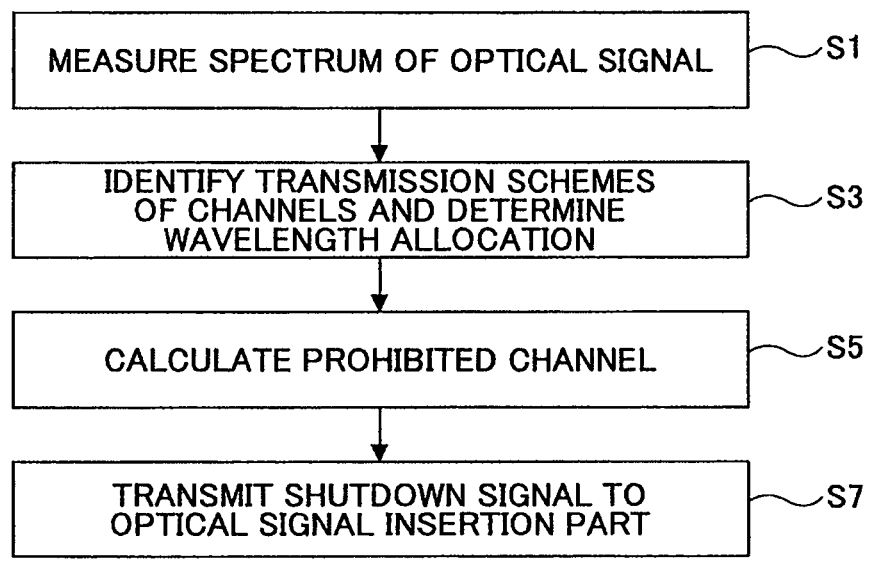
FIG. 2 is a flowchart illustrating operations performed in the optical transmission system of FIG. 1 according to the first embodiment.

If optical signal transmission schemes differ, properties of optical signals, such as noise tolerance, dispersion tolerance, and non-linearity tolerance, also differ. This indicates that different transmission schemes require different compensation systems. A direct method for transmitting optical signals of different transmission schemes from a transmitter to a receiver is to prepare a transmission line (optical fiber) for each transmission scheme to construct an optical transmission system for each transmission scheme. For example, a transmission system dedicated for optical signals of 10 Gbps and a transmission system dedicated for optical signals of 40 Gbps are separately prepared and separately managed. However, while construction of such a system is expensive, expectation may not be as high for a demand for high-speed transmission services of 40 Gbps as for a demand for common optical transmission services of 10 Gbps. A low demand for dedicated system services may cause a great loss to both the operator and users.

On the other hand, the problems of facility investment and high costs may be solved to some extent by allocating some of the channels of a WDM transmission system of 10 Gbps (for example, five of forty channels in total) to 40-Gbps transmission. However, for transmission through channels of different transmission schemes in the physically same transmission path, no technique has been established for appropriately compensating for each of the channels in a repeater in the transmission path.

Further, it is also desired to pay attention to the interaction between channels of different transmission schemes in the same transmission path. For example, in the case of transmitting a signal according to intensity modulation and a signal according to phase modulation in the same transmission path, a change in the intensity of the intensity-modulated signal may affect the phase-modulated signal to cause fluctuation in its phase, so that so-called crosstalk may be caused. Thus, inappropriate wavelength allocation may degrade signal quality so that performing wavelength multiplexing may make less or no sense.

According to an aspect of the invention, appropriate wavelength allocation may be achieved in an optical transmission system that transmits optical signals of different transmission schemes (transmission rates and modulation techniques) by WDM.

According to an aspect of the invention, a repeater used in a WDM optical transmission system determines a bit rate and a modulation technique with respect to each of channels in a received signal, and determines the channel allocation of a received signal. The repeater detects a prohibited channel that is not to be included in an optical signal to be transmitted from the repeater based on the channel allocation and a predetermined determination criterion. The prohibited channel is detected based on the channel allocation and the predetermined determination criterion, and channels are selected so as not to pass the prohibited channel. As a result, appropriate channel allocation is achieved.

In view of preventing inappropriate channel selection, a user may be warned that the optical signal to be transmitted from the repeater includes the prohibited channel.

The predetermined determination criterion may be that channels having different bit rates are not to be adjacent to each other. The predetermined determination criterion may be that channels employing different modulation techniques are not to be adjacent to each other. The predetermined determination criterion may be that a channel according to intensity modulation and a channel according to phase modulation are not to be adjacent to each other. The predetermined determination criterion may be that channel allocation that causes phase noise exceeding a predetermined value is not allowed.

In view of discovering a prohibited channel with as little effect on existing channels as possible, the power of a signal to be input to the repeater may be lower than its proper level during a standby mode where it is determined whether to authorize the inputting of the signal, and may be returned to its proper level after the inputting of the signal is authorized.

In view of preventing an inappropriate signal from being input from not only its own node but also another node, the repeater may transmit an optical control signal (OSC) to a preceding repeater, the optical control signal indicating that the prohibited channel is not to be input.

If there are multiple preceding repeaters, in view of not transmitting an unnecessary optical control signal to repeaters irrelevant to the prohibited channel, each of the repeaters may determine which one of the repeaters passes the prohibited channel, and the optical control signal may be transmitted to preceding repeaters that may be passing the prohibited channel.

According to an aspect of the invention, a network management system (NMS) is used in a WDM optical transmission system. The NMS includes a part configured to determine channel allocation with respect to each of multiple repeaters by determining a bit rate and a modulation technique with respect to each of channels in an optical signal received by each of the repeaters; and a detection part configured to detect a prohibited channel not to be included in the optical signal to be transmitted from each of the repeaters, based on the channel allocation and a predetermined criterion. Collectively managing multiple repeaters makes it possible to immediately identify a repeater related to the prohibited channel.

Not only the prohibited channel but also a recommended channel that may be included in the optical signal to be transmitted from each of the repeaters may be detected. The recommended channel may be selected (determined) so as to form channel allocation that causes phase noise to be lower than a predetermined value. The recommended channel may be selected as a channel that does not correspond to the prohibited channel in any relay node between a source and a destination.

Preferred embodiments of the present invention are explained below with reference to the accompanying drawings.

[a] First Embodiment

FIG. 1 is a diagram for illustrating an optical transmission system according to a first embodiment.

The optical transmission system multiplexes and transmits optical signals of multiple wavelengths (channels) according to WDM. The multiplexed signals may include signals of different transmission schemes specified by their respective bit rates and modulation techniques. Referring to (a) of FIG. 1, the optical transmission system includes multiple optical add-drop multiplexers (modules) (OADMs) 1-1, 1-2, and 1-3 interconnected through a transmission line 12; spectrum analyzers related to the respective OADMs 1-1 through 1-3 (of which spectrum analyzers 2-1 and 2-2 are illustrated in FIG. 1); and computation parts related to the respective OADMs 1-1 through 1-3 (of which computation parts 3-1 and 3-2 are illustrated in FIG. 1). The OADMs 1-1 through 1-3 may be collectively referred to as the "OADM 1" in the following description. The spectrum analyzers including the spectrum analyzers 2-1 and 2-2 may be collectively referred to as the "spectrum analyzer 2" in the following description. The computation parts including the computation parts 3-1 and 3-2 may be collectively referred to as the "computation part 3" in the following description.

In FIG. 1, for convenience of description, the section between two adjacent OADMs 1-($i$−1) and 1-$i$ is referred to as "OADM 1-($i$−1) section." Further, a section where an optical signal is transmitted without a change in wavelength in a channel is referred to as a "path." For example, referring to (a) of FIG. 1, a path 4-1 indicates that transmission is performable without a change in wavelength over the section between the OADM 1-1 and the OADM 1-2 in a certain channel. Likewise, a path 4-2 indicates that transmission is performable without a change in wavelength over the section between the OADM 1-2 and the OADM 1-3 in a certain channel, and a path 4-3 indicates that transmission is performable without a change in wavelength over the section between the OADM 1-1 and the OADM 1-3 in a certain channel.

The transmission line 12 is formed of an optical fiber, and may support multiplex transmission using 40 kinds of wavelengths (40 channels) according to WDM, for example. The transmission schemes (including at least a modulation technique and a bit rate) of the transmission channels may be the same or different from each other. The number of channels mentioned above is one example, and may be selected from various values. Amplifiers (of which amplifiers 16-1 through 16-4 and amplifiers 24-1 through 24-4 are illustrated in FIG. 1) are provided in the transmission line 12.

Each of the amplifiers 16-$i$ and 24-$j$ collectively amplify the light power of various wavelengths (channels) propagated through the transmission line 12. Adjustments for individual channels are made in the OADMs 1-1 through 1-3.

The OADM 1 operates as a source node, a relay node, or a destination node in the optical transmission system. In general, the OADM 1 has the function of adding an optical signal of a specific wavelength to an optical fiber (Add), dropping (removing) an optical signal of a specific wavelength from an optical fiber (Drop), passing an optical signal received from the preceding device directly through to the subsequent device (Through), and passing an optical signal received from the preceding device through to the subsequent device after changing the wavelength of the received optical signal (Change). More generally, however, the OADM 1 has one or more of the above-described functions for one or more of the wavelengths available in the system.

The optical transmission system includes optical sources (optical transponders), of which optical sources 5-1 and 5-2 (indicated as Tx) are illustrated in FIG. 1. The optical sources prepare optical signals to be added to the optical fiber.

The spectrum analyzer 2 analyzes the spectrum of an optical signal transmitted through the OADM 1 that the spectrum analyzer 2 accompanies. The method of analysis is described below. The result of the analysis is represented by the wavelength allocation of the channels included in the received signal.

The computation part 3 specifies or identifies one or more channels that are not to be used for transmission from the related OADM 1 to the subsequent OADM 1 based on the wavelength allocation reported from the corresponding spectrum analyzer 2 and one or more predetermined determination criteria. Further, the computation part 3 calculates the amount of adjustment necessary for each of the channels in an optical signal, and outputs a compensation signal indicating the amount of adjustment.

A description is given of calculation of prohibited channels and generation of a shutdown signal.

FIG. 2 is a flowchart illustrating operations performed in the optical transmission system of FIG. 1, such as an operation performed in the OADM 1. Since the same operation is performed in each OADM 1, the flow is described as operations related to the OADM 1-2, the spectrum analyzer 2-2, and the computation part 3-2 of FIG. 1.

In step S1, the spectrum of an optical signal received by the OADM 1-2 is measured with the spectrum analyzer 2-2.

In step S3, the spectrum analyzer 2-2 determines the transmission scheme of each of the channels multiplexed in the optical signal received by the OADM 1-2, and determines the wavelength allocation of the optical signal received by the OADM 1-2. The computation part 3-2 is notified of the transmission scheme and the wavelength allocation. The transmission scheme is identified by the bit rate and the modulation technique. The method of identifying the transmission scheme is described below with reference to FIG. 3.

In step S5, the computation part 3-2 specifies or identifies one or more channels not to be used for transmission from the OADM 1-2 to the OADM 1-3 at the subsequent stage based on the wavelength allocation discovered in the spectrum analyzer 2-2 and one or more predetermined determination criteria. The determination criteria may be expressed by any appropriate metrics such as a bit rate and a modulation technique. For example, one or more determination criteria such as those described below may be suitably used.

(a) Channels of different bit rates are not allowed to be closer than a predetermined wavelength interval.

(b) Channels of different modulation methods are not allowed to be closer than a predetermined wavelength interval.

(c) A channel of a rate of 10 GHz according to intensity modulation and a channel of a rate of 40 GHz according to phase modulation are not allowed to be adjacent to each other.

(d) Phase noise is not allowed to exceed a predetermined value.

By way of example, phase noise $\sigma^2_{XPM,0}$ may be calculated by the following Equation (1):

$$\sigma^2_{XPM,0}(\Delta\lambda) = 4\int_{-1/T}^{1/T} \Phi_2(f)|H_{12}|^2 \sin^2(\pi f T_1) df, \quad (1)$$

where f represents a frequency, T represents a period, and $H_{12}$ represents a transfer function. Equation (1) described above represents phase noise between a signal according to intensity modulation such as on-off keying (OOK) and a signal according to phase modulation such as phase-shift keying (PSK). In the worst case, the phase noise of all of N OADM sections is N times the value of the phase noise of a single OADM section. Further, the effect of M OOK channels over one PSK channel may be evaluated by the sum of the phase noise received from individual channels as follows:

$$\sigma^2_{XPM,1}(\Delta\lambda) = \sum_{K=1}^{M} \sigma^2_{XPM,0}(k\Delta\lambda). \quad (2)$$

Noise and other appropriate metrics may be calculated for combinations of signals according to other transmission schemes, using a known method in the art. For example, "ECOC 2005 Proceedings—vol. 2 Paper Tu 1.2.2." illustrates the above-described equations related to phase noise.

For convenience of description, it is assumed that the determination criterion is that "a channel of a rate of 10 GHz according to intensity modulation and a channel of a rate of 40 GHz according to phase modulation are not allowed to be adjacent to each other."

A description is given of an operation related to the OADM 1-1 as an example operation in step S5. It is assumed that the wavelength allocation in the OADM 1-1 is as illustrated in (b) of FIG. 1. In the case illustrated in (b) of FIG. 1, an intensity-modulated signal of 10 GHz is transmitted through Channel 1

(ch1), Channel 2 (ch2), and Channel 10 (ch10). If the above-described determination criterion is applied here, a phase-modulated signal of 40 GHz is not allowed to be transmitted in any of Channel 3 (ch3), Channel 9 (ch9), and Channel 11 (ch11). Channels in which transmission is thus prohibited are referred to as "prohibited channels." In the illustrated case, a user intends to insert a phase-modulated signal of 40 GHz into Channel 3, but it is confirmed in the computation part 3-1 related to the OADM 1-1 that Channel 3 is a prohibited channel.

In step S7, the calculation part 3-1 transmits, to the transponder (transmitter) 5-1, a control signal (shutdown signal) to prohibit insertion of Channel 3 into the OADM 1-1, so as to prevent inputting of a prohibited channel.

A description is given, with reference to (c) of FIG. 1, of an operation related to the OADM 1-2 as another example operation in step S5. In the illustrated case, in the OADM 1-2, a user intends to insert a phase-modulated signal of 40 GHz into Channel 13 (ch13) and Channel 14 (ch14). It is assumed that transmission continues in Channel 1, Channel 2, and Channel 10 of 10 GHz. Accordingly, for the phase-modulated signal of 40 GHz, Channel 3, Channel 9, and Channel 11 continue to be prohibited channels. If insertion of Channel 14 is authorized, Channel 13 and Channel 15 (ch15) adjacent to Channel 14 become prohibited channels. This is determined in the computation part 3-2 related to the OADM 1-2.

In step S7, the calculation part 3-2 transmits, to the transponder (transmitter) 5-2, a control signal (shutdown signal) to prohibit insertion of Channel 13 into the OADM 1-1, so as to prevent inputting of a prohibited channel.

Thus, according to this embodiment, an OADM determines a prohibited channel that is not to be passed through to its subsequent OADM, and inputting of the prohibited channel is prevented. If an OADM determines that a prohibited channel is already included (used) in a signal received from its preceding OADM, the OADM that has received the signal may prevent the prohibited channel from being passed through to its subsequent OADM. That is, the OADM that has received the signal may prevent the passage of the prohibited channel. Thus, according to this embodiment, a channel that is not to be passed through to a subsequent OADM may be prevented from being included in an optical signal, so that an appropriate wavelength allocation may be realized.

Next, a description is given of detection of the transmission scheme.

Figure 3:
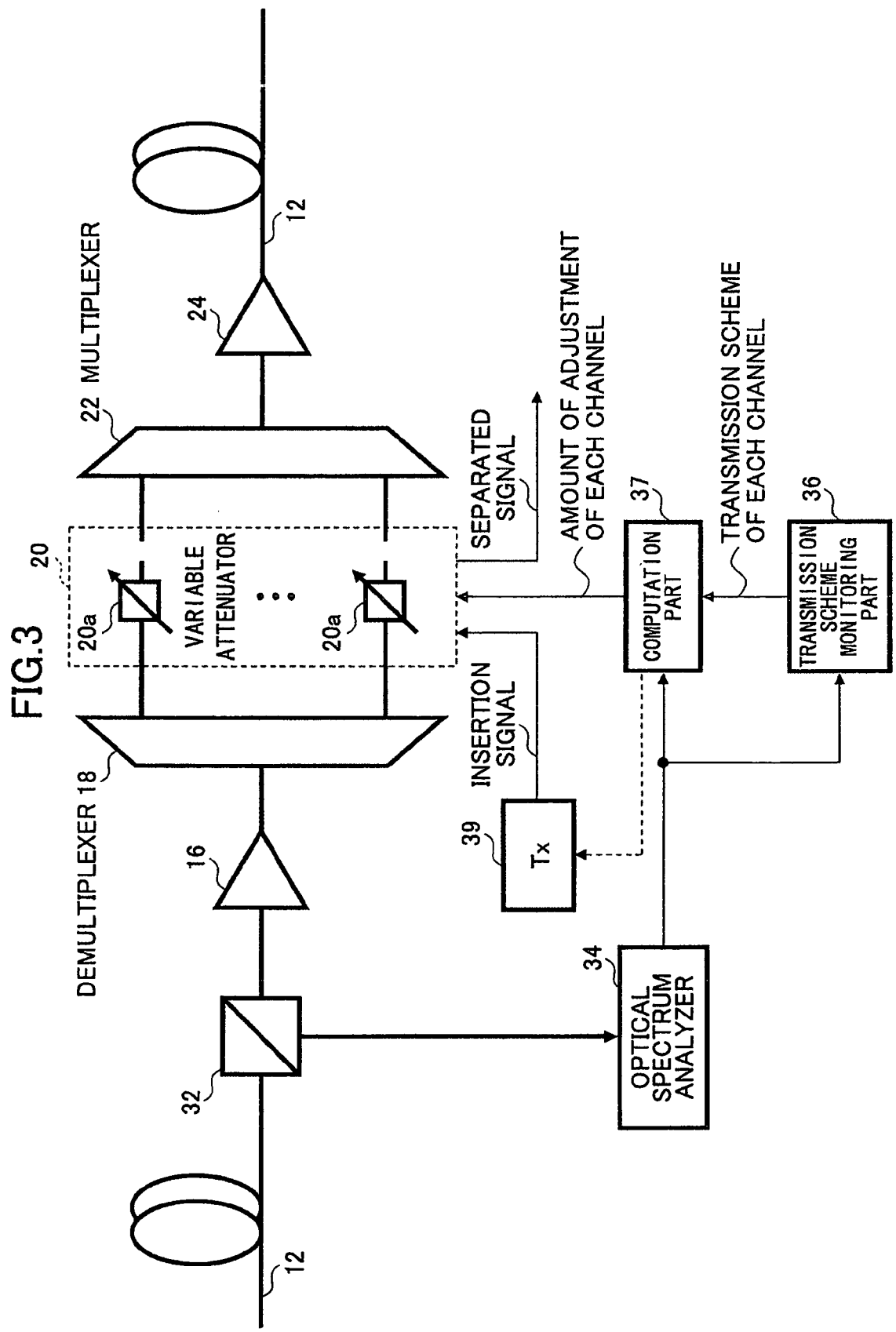
FIG. 3 is a block diagram illustrating an optical add-drop multiplexer according to the first embodiment.

FIG. 3 illustrates a configuration of the OADM 1. In FIG. 3, the same elements as those described above are referred to by the same reference numerals. FIG. 3 illustrates the transmission line 12, optical amplifiers 16 and 24, a demultiplexer 18, an adjustment part 20, a multiplexer 22, a branch node 32, an optical spectrum analyzer 34, a transmission scheme monitoring part 36, and the computation part 37. In general, the optical spectrum analyzer 34 and the transmission scheme monitoring part 36 correspond to the "spectrum analyzer 2" of FIG. 1. Further, the optical amplifier 16 may be the amplifier 16-$i$ of FIG. 1, and the optical amplifier 24 may be the amplifier 24-$j$ of FIG. 1.

A redundant description of the transmission line 12 and the optical amplifiers 16 and 24, which are described above, is omitted.

The demultiplexer 18 pulls multiple channels out of an optical signal input to its one end, and outputs the channels from its other end in parallel.

The adjustment part 20 makes some adjustments related to transmission characteristics on each of the channels output from the demultiplexer 18. A typical example of the transmission characteristics to be adjusted is light power level. The light power level is adjusted with variable attenuators 20$a$ as illustrated in FIG. 3. From the viewpoint of adjustment of the light power level, the adjustment may be either amplification or attenuation. However, for adjusting the light power level with as little introduction of different levels of noise to the individual channels as possible, it is preferable to adjust the light power level using not amplifiers but attenuators.

The multiplexer 22 combines the channels input to its one end using a wavelength multiplexing, technique, and outputs a multiple wavelength (wavelength-multiplexed) signal from its other end. In the case illustrated in FIG. 3, the output optical signal is optically amplified with respect to each of the channels at a time by the optical amplifier 24, and is transmitted.

The branch node 32 provides the optical spectrum analyzer 34 with part of the optical signal transmitted through the transmission line 12. The branch node 32 may be a node dedicated for branching, an add/drop node, or a coupler.

The optical spectrum analyzer 34 analyzes the spectrum of the optical signal transmitted through the transmission line 12, and outputs optical spectrum information. As a result, the features (characteristics) of the optical signal are extracted. In the case illustrated in FIG. 3, the optical signal is input to the optical spectrum analyzer 34 on the input side of the OADM 1 or a repeater. Alternatively, the optical signal may be input to the optical spectrum analyzer 34 on the output side of the OADM 1. From the standpoint of analyzing an optical signal affected by optical noise introduced in the OADM 1, it is preferable to analyze the optical signal on the output side of the OADM 1. However, if there are a large number of OADMs in the transmission line 12, there might be little actual advantage in distinguishing between the input side and the output side of the OADM 1.

As described below, the transmission scheme monitoring part 36 determines or identifies the transmission schemes of the individual channels included in the optical signal based on the optical spectrum information.

A computation part 37 determines the amount of adjustment of each channel in addition to functioning as the computation part 3 described with reference to FIG. 1.

An optical source (Tx) 39 is an optical signal source for inserting a channel of a specific wavelength into an optical signal. An instruction as to whether to authorize insertion of an optical signal is given by the computation part 37. (Alternatively, such an instruction may be given by a network management system (NMS) as described below.)

Figure 4:
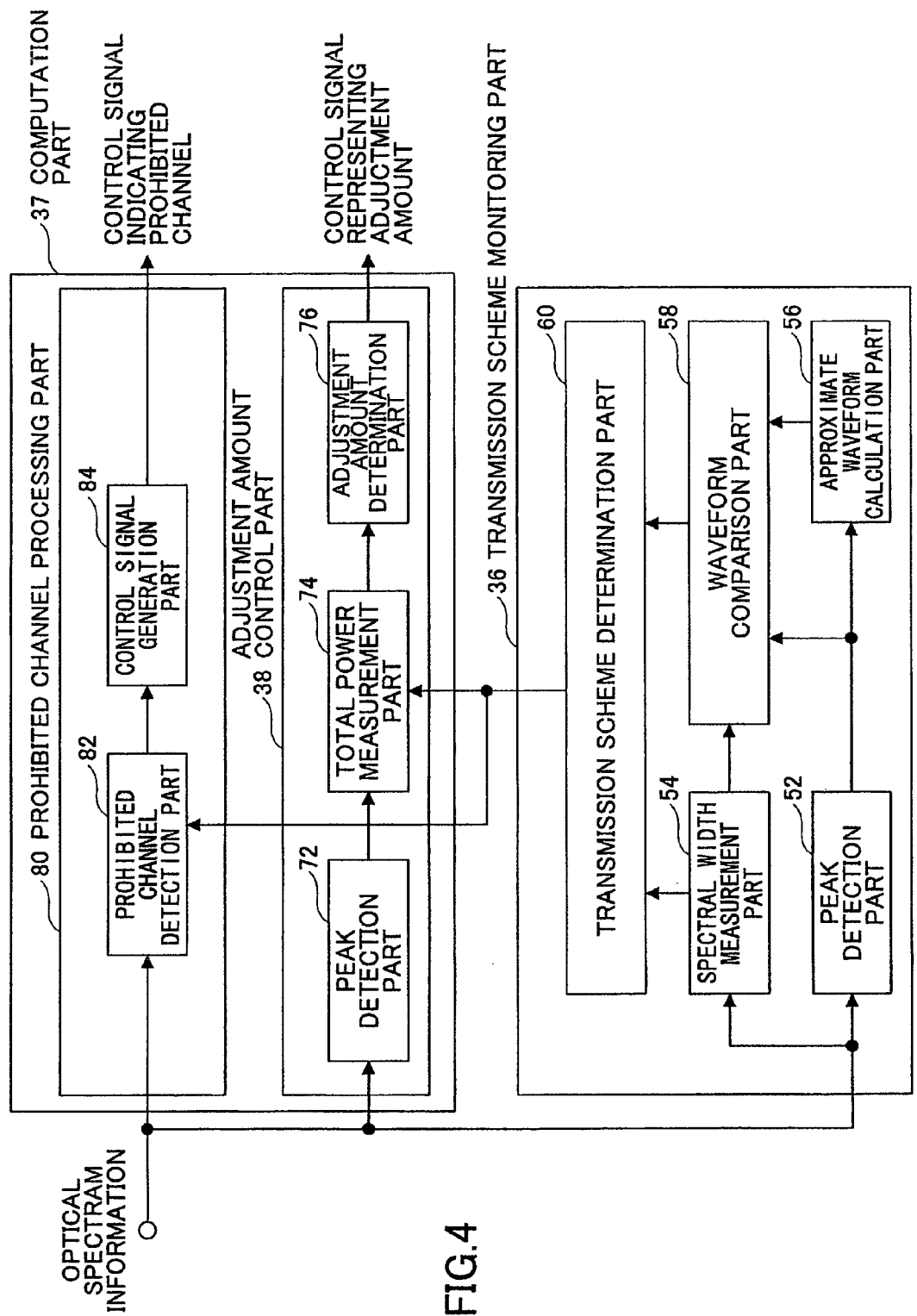
FIG. 4 is a block diagram illustrating a transmission scheme monitoring part and a computation part according to the first embodiment.

FIG. 4 is a block diagram illustrating the transmission scheme monitoring part 36 and the computation part 37. Referring to FIG. 4, the transmission scheme monitoring part 36 includes a peak detection part 52, a spectral width measurement part 54, an approximate waveform calculation part 56, a waveform comparison part 58, and a transmission scheme determination part 60. The computation part 37 includes an adjustment amount control part 38 and a prohibited channel processing part 80. The adjustment amount control part 38 includes a peak detection part 72, a total power measurement part 74, and an adjustment amount determination part 76. The prohibited channel processing part 80 includes a prohibited channel detection part 82 and a control signal generation part 84.

The peak detection parts 52 and 72 detect the peak of each channel based on the optical spectrum information. The peak detection parts 52 and 72 may be provided separately as illustrated in FIG. 4 or may be implemented as a common element.

The spectral width measurement part 54 measures the spectral width of the waveform of each channel, and provides the transmission scheme determination part 60 with the measurement results. The spectral width is typically measured in full width at half maximum (FWHM), but may be measured in other quantities as long as it is possible to evaluate the degree of wavelength dispersion (the width of the waveform) of light power.

The approximate waveform calculation part 56 performs fitting, or calculates (determines) a curve that approximates a waveform obtained from the optical spectrum information. In this case, fitting is performed on the waveform from which a peak has been removed. In other words, the approximate waveform calculation part 56 calculates an approximate curve that approximates a waveform obtained by removing peak data from a raw (unprocessed) waveform obtained from the spectrum information. A method of using the approximate curve is described below.

The waveform comparison part 58 compares the actual waveform with a peak and the calculated approximate curve, and outputs a comparison result to the transmission scheme determination part 60.

The transmission scheme determination part 60 determines the transmission schemes (modulation techniques and bit rates) used in the channels in the optical signal based on their spectral widths and the comparison result from the waveform comparison part 58.

The adjustment amount control part 38 determines adjustments necessary for each of the channels based on the transmission schemes of the channels determined by the transmission scheme monitoring part 36 and the optical spectrum information. The determined adjustments are reported in the form of a control signal to corresponding adjustment elements (the variable attenuators 20*a* in the case illustrated in FIG. 3) of the adjustment part 20. The adjustment elements adjust the light power level in accordance with the instructions given by the control signal.

Referring to FIG. 4, the total power measurement part 74 measures the total power (levels) of the individual channels based on their peak values. The total power, which is set to a certain value (level) at the time of transmission, may be determined by integrating the waveform of each channel over a predetermined wavelength range including the peak value. However, the total power determined by this integration includes the noise of one or more optical amplifiers, so that it is difficult to estimate the total power with accuracy from the result of the integration as it is. Therefore, the total power measurement part 74 measures the total power (levels) of the channels with accuracy using their peak values and their transmission schemes determined by the transmission scheme monitoring part 36.

The adjustment amount determination part 76 determines the amounts of adjustment (the amounts of adjustment of light power levels) to be applied to the respective channels based on the calculated (measured) total power (levels).

The prohibited channel detection part 82 of the prohibited channel processing part 80 identifies the wavelength allocation based on the optical spectrum information and the transmission schemes, and identifies one or more prohibited channels in accordance with one or more predetermined determination criteria as described above.

The control signal generation part 84 prepares a control signal to be transmitted to the elements of its own node or another node. For example, the control signal generation part 84 generates a shutdown signal, or a control signal indicating that the inputting of a prohibited channel is not authorized.

Figure 5:
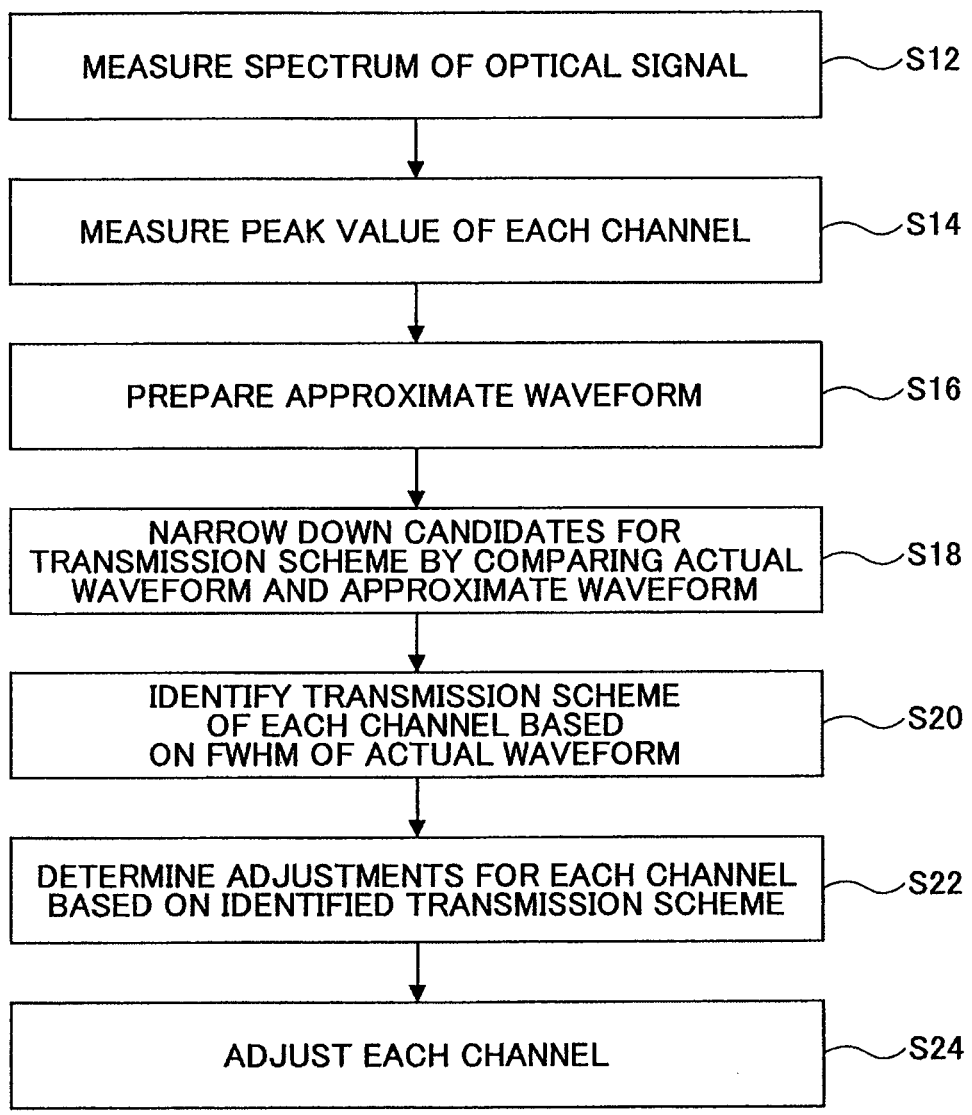
FIG. 5 is a flowchart illustrating a process for determining the amount of adjustment of light power according to the first embodiment.
Figure 6:
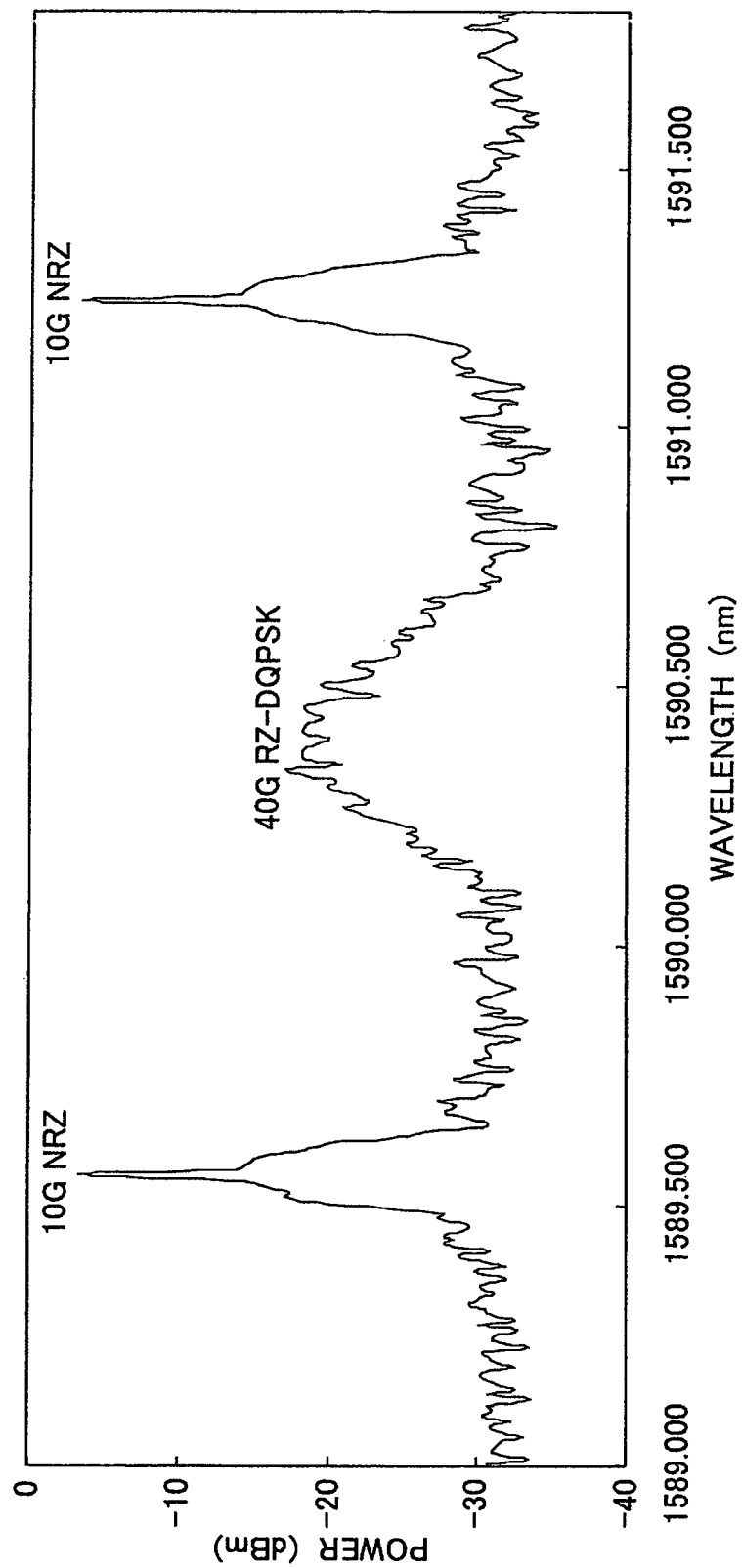
FIG. 6 is a graph illustrating a wavelength-multiplexed signal according to the first embodiment.

FIG. 5 is a flowchart illustrating a process for determining the amount of adjustment of light power according to this embodiment. In step S12, the optical spectrum analyzer 34 measures the spectrum of an optical signal, and outputs the measurement result to the transmission scheme monitoring part 36 and the adjustment amount control part 38 as spectrum information. FIG. 6 illustrates an example of the measurement result. In the example illustrated in FIG. 6, three channels are multiplexed in the optical signal. By way of example, the transmission schemes of the three channels are as follows:

Channel 1 (CH1): 10 Gbps, NRZ
Channel 2 (CH2): 40 Gbps, DQPSK
Channel 3 (CH3): 10 Gbps, NRZ In step S12, however, the transmission schemes of the individual channels are unknown although the waveforms of the individual channels are known.

Then, in step S14, the peak values (and peak positions) of the individual channels are measured. As illustrated in FIG. 6, Channel 1 and Channel 3, which use the same transmission scheme, are supposed to present peaks of substantially the same level. On the other hand, the waveform of Channel 2 is different from the waveforms of Channel 1 and Channel 3 because Channel 2 uses a different transmission scheme. Accordingly, the waveform of Channel 2 does not have to present a peak of the same level as the waveforms of Channel 1 and Channel 3. Thus, if channels of different transmission schemes are multiplexed, a mere comparison of peak data is not sufficient for the OADM 1 to make appropriate compensation.

Figure 7:
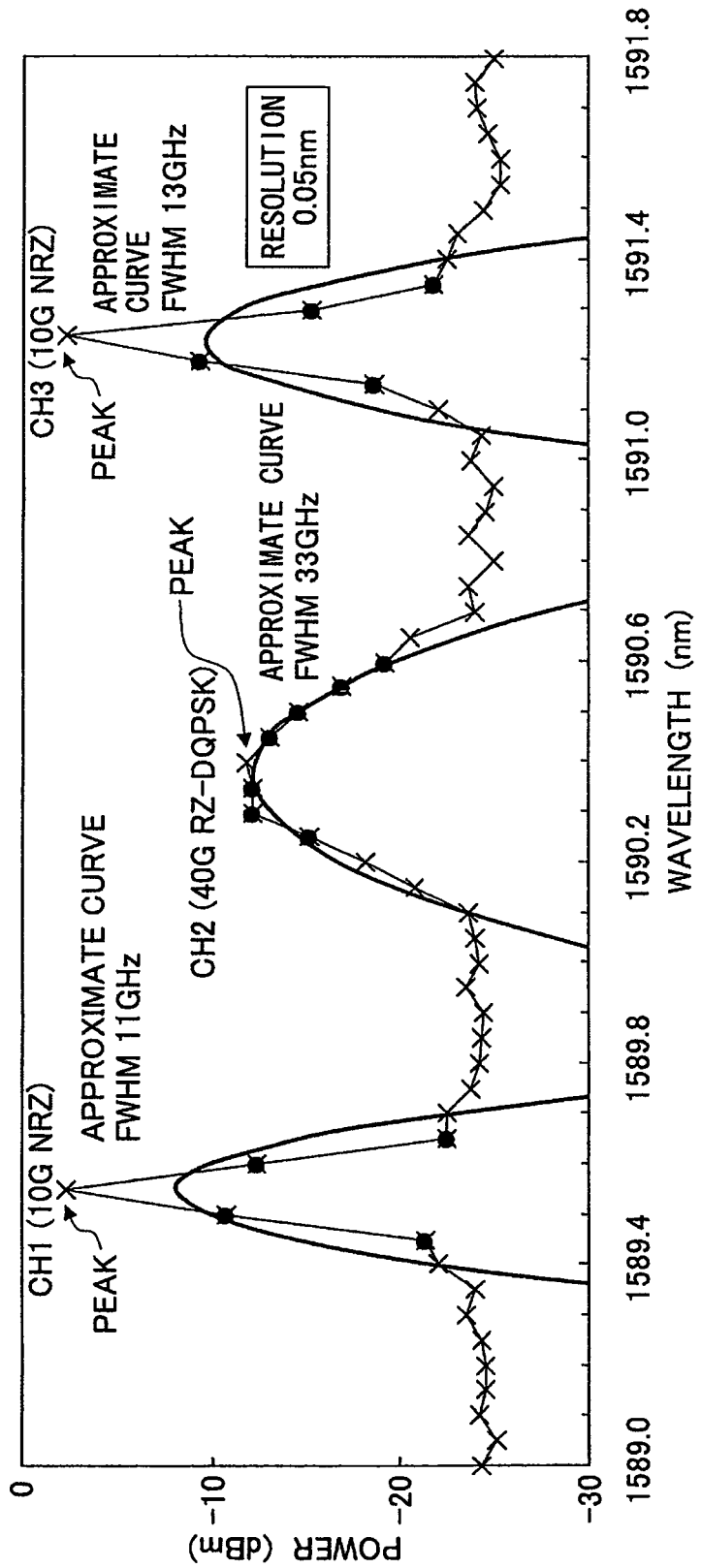
FIG. 7 is a graph illustrating an actual waveform and an approximate waveform according to the first embodiment.

In step S16, each of the waveforms representing the individual channels is approximated to a certain approximate curve. In this case, a peak is removed from the waveform obtained from the spectrum information (actual waveform), and the waveform subjected to removal of the peak is approximated to an approximate curve. Any appropriate curves (including broken lines) may be used as approximate curves. For example, the approximate curve may be a curve that has only one extreme within a predetermined wavelength range including a wavelength that provides the peak (of the waveform before its removal) (for example, a quadratic curve). The predetermined wavelength range may be the one defined in total power. According to this embodiment, as illustrated in FIG. 7, the actual waveforms and approximate waveforms related to CH1 through CH3 are used. In FIG. 7, the actual waveforms are plotted with crosses, and the approximate waveforms are plotted with black circles.

In step S18, the actual waveforms and the approximate waveforms are compared so as to narrow down candidates for the transmission schemes of the individual channels.

In step S20, the candidates for the transmission scheme of each of the channels are narrowed down based on the FWHM of the actual waveform. The FWHM may be derived from the approximate waveform. The transmission scheme of each of the channels is identified by executing step S18 and step S20. Step S18 is described as a step preceding step S20 for convenience of explanation. However, the order of these steps may be reversed, or these steps may be performed, partly or entirely, in parallel at the same time.

In the specific case illustrated in FIG. 6 and FIG. 7, each of Channel 1 and Channel 3 has a single data item of significant difference and has a FWHM of about 10 GHz. Therefore, it is determined that the modulation scheme of Channel 1 and Channel 3 is NRZ and its bit rate is 10 Gbps. Channel 2 has no data of significant difference and has a FWHM of about 40 GHz. Therefore, it is determined that the modulation scheme of Channel 2 is RZ-DQPSK and its bit rate is 40 Gbps.

In Step S22 of FIG. 5, the amount of adjustment for each channel is determined based on its identified transmission scheme. The amount of adjustment may be determined based on a predetermined correlation (correspondence) between transmission schemes and peak values. The correlation may be stored in a memory.

In step S24, the light power levels of the respective channels are adjusted (controlled) based on a control signal. Thereafter, the adjusted channels are multiplexed into a wavelength-multiplexed signal by the multiplexer 22 (FIG. 3), and the wavelength-multiplexed signal is output to be transmitted along the optical fiber (transmission line 12).

[b] Second Embodiment

FIG. 8 is a diagram for illustrating an optical transmission system according to a second embodiment. In (a), (b), and (c) of FIG. 8, the same elements as those illustrated in FIG. 1 are referred to by the same reference numerals.

According to the first embodiment, referring to FIG. 3, after identification of a prohibited channel, the transponder (transmitter) 39 of a corresponding node is notified of the prohibition of inputting the prohibited channel. Referring to FIG. 1, the inputting of Channel 3 is prohibited in the OADM 1-1, and the inputting of Channel 13 is prohibited in the OADM 1-2. Further, it is possible that a prohibited channel has been included in an optical signal received by an OADM. In this case, the OADM that has detected the prohibited channel prevents passage of the prohibited channel. This makes it possible to directly prevent the prohibited channel from passing through to subsequent OADMs. However, from the viewpoint of the optical transmission system, the prohibited channel still propagates (to the OADM). According to the second embodiment, such propagation of the prohibited channel itself may be prevented.

Like in the first embodiment, if the OADM 1 identifies a prohibited channel, the OADM 1 prevents inputting of the prohibited channel if the prohibited channel is about to be input to the node of the OADM 1. On the other hand, if the prohibited channel is not about to be input to the node of the OADM 1, the OADM 1 notifies a node on its upstream side in the optical transmission line 12.

For example, it is assumed that as illustrated in (c) of FIG. 8, it is determined in the spectrum analyzer 2-2 of the OADM 1-2 that an intensity-modulated signal of 10 GHz is being transmitted through Channel 4 (ch4), Channel 10, and Channel 14 and a phase-modulated signal of 40 GHz is being transmitted through Channel 3. It is assumed that the determination criterion that "a channel of a rate of 10 GHz according to intensity modulation and a channel of a rate of 40 GHz according to phase modulation are not allowed to be adjacent to each other" is used the same as in the first embodiment. In this case, Channel 3 goes against this rule. Therefore, usage of this channel is to be prohibited. It is assumed, however, that the OADM 1-2, which has confirmed this situation, does not have the function of inputting Channel 3. (In the case illustrated in FIG. 8, the OADM 1-2 has the function of prohibiting the inputting of Channel 13 and Channel 14.) The OADM 1-2 notifies the OADM 1-1, which is the upstream node, that the inputting of Channel 3 (as illustrated in (b) of FIG. 8) is to be prohibited. This notification may be made using any appropriate control signal. For example, an optical supervisory channel (OSC) may be used. In the case illustrated in FIG. 8, the OADM 1-2 notifies the OADM 1-1 that Channel 3 is not to be input using an OSC 7. In response to reception of this notification, the OADM 1-1 stops inputting Channel 3, so as to prevent improper passage of Channel 3.

The upstream node may be notified of, in addition to an inappropriately existing prohibited channel (Channel 3 in the above-described case), information indicating another prohibited channel if control traffic allows of its notification. For example, the OADM 1-2 may notify the OADM 1-1 that Channels 3, 5, 9, 11, 13, and 15 are prohibited. This allows the upstream node to select a channel in line with the intention of the downstream node and accordingly to improve the efficiency of channel use. In the case illustrated in FIG. 8, it is possible for the OADM 1 to input channels while avoiding Channels 13 and 15. It is difficult to select channels in this manner based only on the information from the spectrum analyzer 2-1 of the OADM 1-1. According to this embodiment, it is possible to select channels in such a manner with the cooperation of the OADMs 1-1 and 1-2.

[c] Third Embodiment

Figure 9:
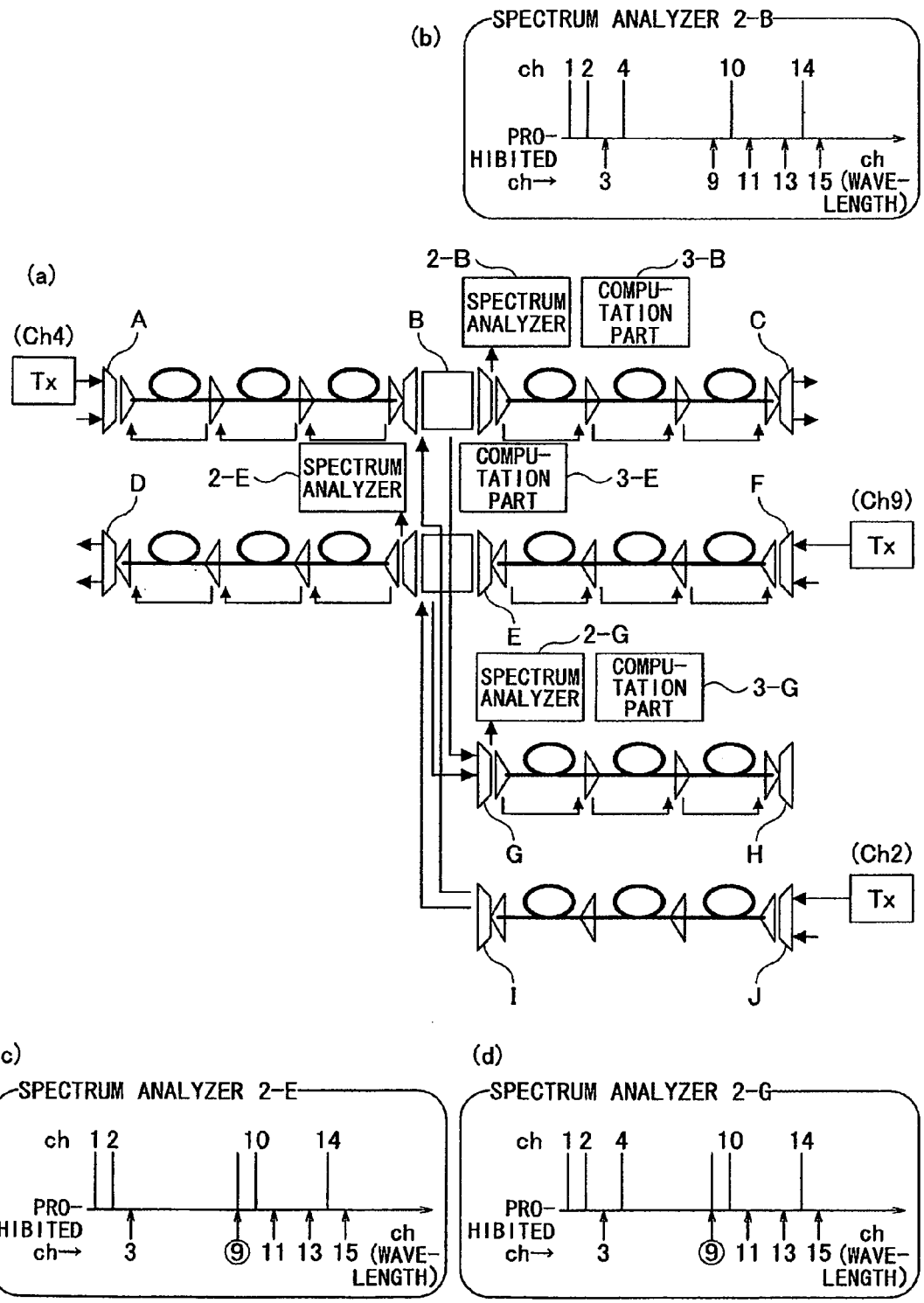
FIG. 9 is a diagram for illustrating an optical transmission system according to a third embodiment.

FIG. 9 is a diagram for illustrating an optical transmission system according to a third embodiment.

In FIG. 1 of the first embodiment and in FIG. 8 of the second embodiment, the optical transmission system is graphically illustrated as a topology on a straight line. This is, however, for simplification of graphical illustration and description, and the optical transmission system may have any appropriate configuration. FIG. 9 illustrates a case where the present invention may be applied to a T-shaped optical hub structure. The optical transmission system may have any number of spectrum analyzers and any number of computation parts as required. In the case illustrated in FIG. 9, for convenience, nodes are labeled with A through J, and spectrum analyzers 2-B, 2-E, and 2-G and computation parts 3-B, 3-E, and 3-G are provided for Nodes B, E, and G, respectively.

The spectrum analyzers 2-B, 2-E, and 2-G and computation parts 3-B, 3-E, and 3-G determine the wavelength allocation in the corresponding nodes (Nodes B, E, and G) and specify prohibited channels the same as in the first and second embodiments. A prohibited channel may be prohibited by a shutdown signal the same as in the first embodiment. The inputting of a prohibited channel may be traced back and prevented in the upstream channel that has input the prohibited channel the same as in the second embodiment. In the case of a linear or annular optical signal transmission line, the upstream node is uniquely identified. However, in the case of an optical transmission system including a branch in a propagation path as illustrated in FIG. 9, a node may have multiple upstream nodes like Node E, for example. In this case, all of the multiple upstream nodes may be notified that a prohibited channel of a specific wavelength is not to be input, or such a notification may be made selectively to those of the upstream nodes with a possibility of having input the prohibited channel. A description is given of an operation in the latter case.

For example, it is assumed that the spectrum analyzer 2-G of Node G has observed a wavelength allocation as illustrated in (d) of FIG. 9. That is, it is assumed that an intensity-modulated signal of 10 GHz is transmitted through Channels 1, 2, 4, 10, and 14 and a phase-modulated signal of 40 GHz is transmitted through Channel 9.

Here, it is assumed that the rule (determination criterion) that "a channel of a rate of 10 GHz according to intensity modulation and a channel of a rate of 40 GHz according to phase modulation are not allowed to be adjacent to each other" is applied. In this case, Channels 3, 9, 11, 14, and 15 are prohibited for the 40 GHz phase-modulated signal, and the assumption is that it has been determined that Channel 9, which is a prohibited channel, is improperly included (in the received signal). The OADM of Node G transmits an OSC signal to upstream nodes in order to prevent Channel 9 from being input. This OSC signal is received by the OADMs of Nodes B and E.

Here, the wavelength allocation at Node E is assumed to be as illustrated in (c) of FIG. 9. As illustrated in (c) of FIG. 9, a signal including prohibited Channel 9 is transmitted through Node E. In the topology illustrated in (a) of FIG. 9, Node E transmits a signal received from Node B and a signal received from Node F. Accordingly, it is determined that prohibited Channel 9 arrives from either Node B or Node F. Accordingly, Node E transmits, to Nodes B and F, a control signal OSC indicating that Channel 9 is not to be input.

Node B transmits a signal received from Node A. The wavelength allocation at Node B is assumed to be as illustrated in (b) of FIG. 9. In the case illustrated in (b) of FIG. 9, prohibited Channel 9 is not passed through Node B. Accordingly, the control signal OSC indicating that Channel 9 is a prohibited channel is not forwarded to Node A.

The control signal OSC is also forwarded from Node E to Node F. In the case illustrated in (a) of FIG. 9, it is assumed that Node F inputs a 40 GHz phase-modulated signal at Channel 9. Node F may stop inputting Channel 9 in response to the control signal OSC from Node E. Thus, each node transmits (forwards) the control signal OSC to an upstream node based on a determination as to whether the prohibited channel has been passed. This prevents unnecessary transmission of the control signal OSC to a node irrelevant to the prohibited channel.

[d] Fourth Embodiment

Figure 10:
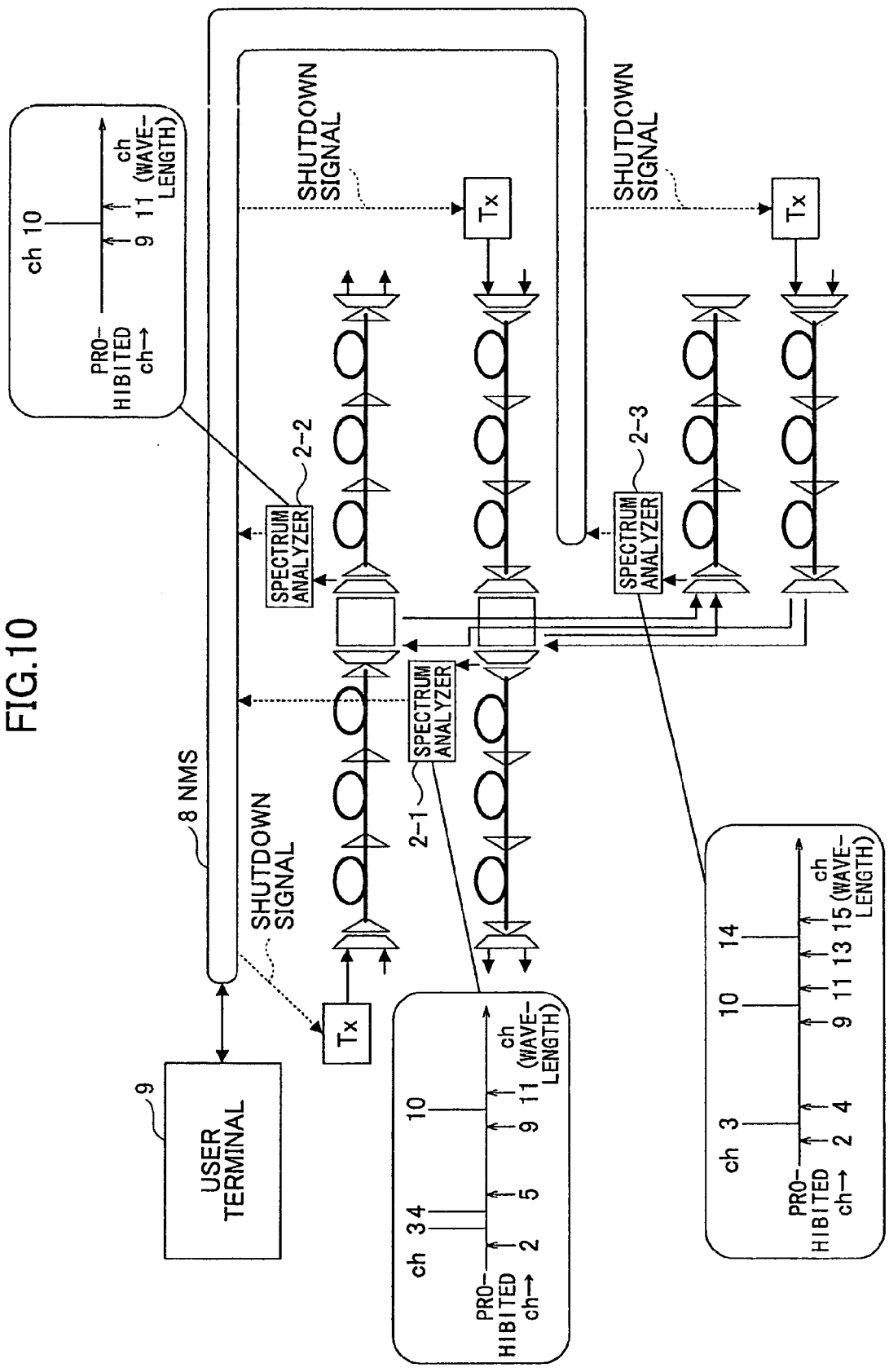
FIG. 10 is a diagram for illustrating an optical transmission system according to a fourth embodiment.

FIG. 10 is a diagram for illustrating an optical transmission system according to a fourth embodiment.

In the first through third embodiments, the computation part 3 is provided for each node. Alternatively, however, the functions of the computation parts 3 related to multiple nodes may be integrated, and in some cases, the functions of the computation parts 3 of all nodes may be centralized. In other words, the functions of the computation parts 3 are distributed among nodes in the first through third embodiments, while by way of example, the functions of the computation parts 3 are implemented collectively by a network management system (NMS) 8 in FIG. 10.

Determining wavelength allocation with respect to a transmitted signal and identifying a prohibited channel in each node are common to the first through fourth embodiments. In the case of collectively implementing the functions of the computation parts 3, however, unlike the second and third embodiments, it is possible to transmit a shutdown signal directly to a node that inputs a prohibited channel (that is, it is unnecessary for the control signal OSC to trace back upstream nodes one after another).

The NMS 8 not only transmits a shutdown signal to each node but also provides a user at a user terminal 9 with information on one or more prohibited channels through a user interface (UIF) (not graphically illustrated in FIG. 10). This information may be provided by directly presenting a prohibited channel calculated by each node or by presenting all channels prohibited in the path from a source node to a destination node. Further, the inputting of a prohibited channel may be prevented by alerting a user who is about to input the prohibited channel by, for example, transmitting an alarm notification. Even if a prohibited channel has been inadvertently input, the NMS may immediately discover the inputting of the prohibited channel and transmit a shutdown signal to a corresponding optical transponder (transmitter) (Tx) to prevent propagation of the prohibited channel.

[e] Fifth Embodiment

A description is given of a fifth embodiment. In the first through fourth embodiments, a prohibited channel is calculated, and its inputting is prevented or a user is presented with the prohibited channel. Alternatively, however, a user may be presented with other useful information. According to a fifth embodiment, for example, a user may not only be notified of a prohibited channel but also be presented with a recommended channel. The recommended channel may be calculated in the prohibited channel detection part 82 of FIG. 4 or prepared with any appropriate technique. For example, a channel that does not correspond to the prohibited channel may be specified or identified as a recommended channel. Alternatively, channel that is not used by any node between a source node and a destination node may be specified or identified as a recommended channel. Alternatively, channels that are combined to reduce the phase noise calculated in Eq. (1) described above may be specified or identified as recommended channels. Alternatively, phase noise may be estimated on a section basis, and a channel that minimizes the phase noise throughout all sections may be recommended. Thus, according to this embodiment, it is possible to present not only a negative opinion, that is, a prohibited channel, but also a positive proposal, that is, a recommended channel to be used for transmission.

[f] Sixth Embodiment

Figure 11:
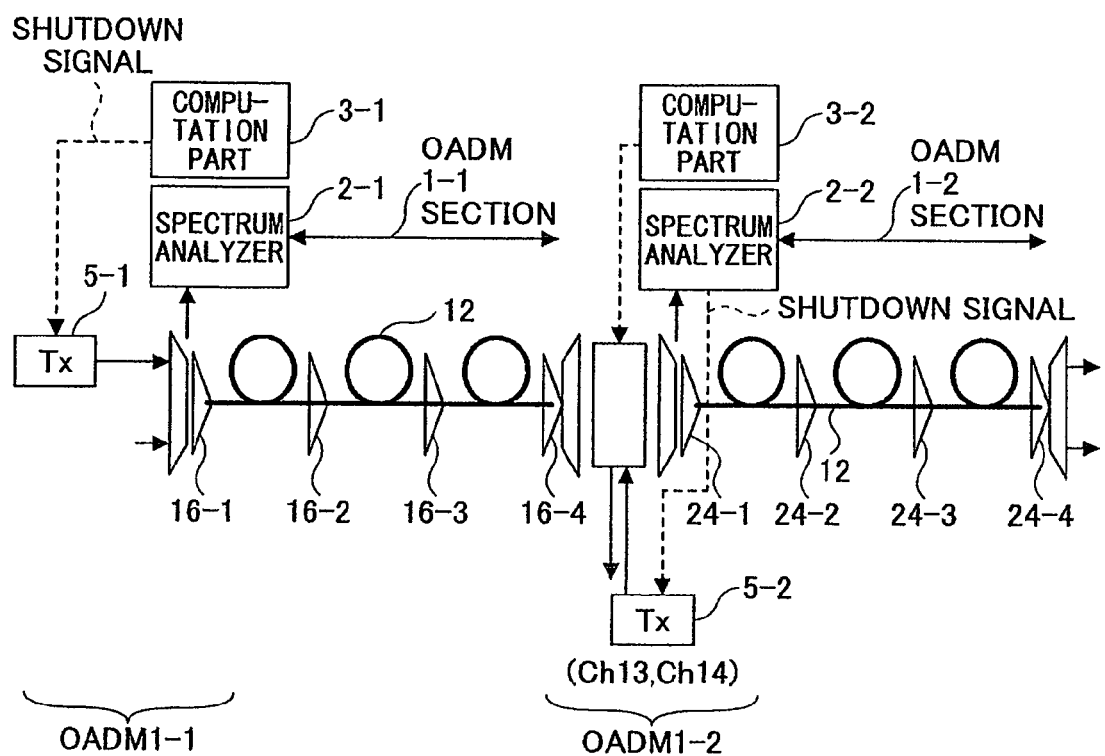
FIG. 11 is a diagram for illustrating an optical transmission system according to a sixth embodiment.

FIG. 11 is a diagram for illustrating an optical transmission system according to a sixth embodiment. In FIG. 11, the same elements as those of FIG. 1 are referred to by the same reference numerals.

As described above, a prohibited channel is specified or identified on a node-by-node (OADM section-by-OADM section) basis in accordance with a certain determination criterion. The determination criterion is determined in view of noise, interference, quality, etc. Therefore, where there are multiple prohibited channels, signal quality may be degraded. Accordingly, it is not preferable for a prohibited channel to actually enter a transmission line with high power in determining existence of multiple prohibited channel. This problem is addressed in this embodiment.

According to the sixth embodiment, when a channel is input from a node, first, it is determined whether there is violation of any determination criterion (rule) between the node and its adjacent node (that is, in a single OADM section). For this determination, a channel is input to only the single OADM section (for example, the OADM 1-1 section) with a power level lower than a proper power level for a predetermined period of time. The proper power level is "a normal operating level," and the power level lower than the proper power level is "a standby level." Once it is confirmed that there is no violation of any determination criterion (rule), it is determined whether there is violation of any determination criterion (rule) in the next OADM section (for example, the OADM 1-2 section). In this case as well, first, the channel is input to only the next OADM section with the power level lower than the proper power level for a predetermined period of time. Then, it is confirmed that there is no violation of any determination criterion (rule). Thereafter, the channel to be input is input at the standby level to successive OADM sections up to the OADM section including a destination node, and it is confirmed that there is no violation of any determination criterion (rule). If there is violation of any determination criterion (rule), the inputting of the channel is prohibited. The inputting of the channel is authorized if there is no violation of any determination criterion (rule) in any of the OADM sections between a source node and the destination node. Thereafter, the channel is input at the proper power level. A signal that authorizes the inputting of the channel is transmitted from the destination node to the source node or to the NMS 8 (FIG. 10) using OSC.

In the case illustrated in FIG. 11 and FIG. 12, 10-GHz intensity-modulated signal Channels 1, 2, 10, and 14 are input from one or more upstream nodes of the OADM 1-1, and are to be transmitted to subsequent OADMs through the OADM 1-1 and the OADM 1-2. In this case, it is assumed that a user inputs 40-GHz phase-modulated signal Channels 3 and 4 from the OADM 1-2 so that Channels 3 and 4 reach nodes subsequent to the OADM 1-2. In a normal operating mode, Channels 3 and 4 have power at normal operating levels as illustrated in (a) of FIG. 12. Generally, the normal operating level may vary from channel to channel. For convenience of description, however, it is assumed that Channels 3 and 4 have the same normal operating level.

First, Channels 3 and 4 are input at the standby power level into only the OADM 1-2 section. The standby power level is substantially lower than the normal operating level. The spectrum analyzer observes a wavelength allocation as illustrated in (b) of FIG. 12. The wavelength allocation observed by the spectrum analyzer 2-2 includes 10-GHz intensity-modulated signal Channels 1, 2, 10, and 14 and 40-GHz phase-modulated signal Channels 3 and 4, which are currently input at a low level. In Channels 1, 2, 10, and 14, where a signal propagates at their respective normal operating levels, power higher than the standby level is observed. On the other hand, Channels 3 and 4, which are input at the standby level, are observed to be low in power. Channels 3, 9, 11, 13, and 15 are prohibited, and in the present case, Channel 3 corresponds to the prohibited channel. Accordingly, the inputting of Channel 3 is rejected, while the inputting of Channel 4 is authorized (accepted). In this case, there may be crosstalk between Channel 2 and Channel 3. However, the power of the 40-GHz phase-modulated signal to be input is substantially lower than its proper value. Accordingly, the effect of the crosstalk, if any, is extremely limited. Accordingly, in the period subsequent to the standby mode, Channel 3 is not input, and the power of Channel 4 is raised to the normal operating level. If the destination node is subsequent to the OADM 1-3, the same determination using the standby mode is performed with respect to one or more sections subsequent to the OADM 1-2 section before the power of Channel 4 is raised to the normal operating level. Then, after it is determined that there is no violation of any determination criterion (rule) in any OADM section, the power of Channel 4 is raised to the normal operating level.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Separation of the embodiments is not essential to the invention, and two or more of the embodiments may be employed as required. Although apparatuses related to the embodiments of the present invention are described using functional block diagrams for convenience of explanation, such apparatuses may be implemented with hardware, software, or a combination thereof. Further, although the embodiments of the present invention have been described in detail, it should be understood that various changes, substitutions, and alterations could be made hereto without departing from the spirit and scope of the invention.

What is claimed is:

1. A repeater, comprising:
   a reception part configured to receive an optical signal transmitted by wavelength division multiplexing from a preceding repeater in a path from a source to a destination;
   a determination part configured to determine a channel allocation of a plurality of channels in the signal received by the reception part by determining a bit rate and a modulation technique with respect to each of the plural channels in the received signal; and
   a detection part configured to detect a prohibited channel not to be included in the optical signal to be transmitted from the repeater, based on the channel allocation of the plural channels and a predetermined criterion regarding the channel allocation of the plural channels,
   wherein the determination part is configured to determine the bit rate and the modulation technique based on optical spectrum information obtained by analyzing a spectrum of the optical signal transmitted from the preceding repeater.

2. The repeater as claimed in claim 1, wherein the detection part is configured to notify a user of the prohibited channel not to be included in the optical signal to be transmitted from the repeater.

3. The repeater as claimed in claim 1, wherein the predetermined criterion is that a first one and a second one of the plural channels are not allowed to be adjacent to each other if the first one and the second one of the plural channels are different in the bit rate.

4. The repeater as claimed in claim 1, wherein the predetermined criterion is that a first one and a second one of the plural channels are not allowed to be adjacent to each other if the first one and the second one of the plural channels are different in the modulation technique.

5. The repeater as claimed in claim 1, wherein the predetermined criterion is that a first one and a second one of the plural channels are not allowed to be adjacent to each other if the modulation technique of the first one of the plural channels is intensity modulation and the modulation technique of the second one of the plural channels is phase modulation.

6. The repeater as claimed in claim 1, wherein the predetermined criterion is that the channel allocation of the plural channels is not allowed to cause a phase noise exceeding a predetermined level.

7. The repeater as claimed in claim 1, wherein, in the repeater, the prohibited channel is prevented from being included in the optical signal to be transmitted from the repeater.

8. The repeater as claimed in claim 7, wherein a power of a signal to be input to the repeater is lower than a proper level during a standby mode where it is determined whether to authorize the inputting of the signal, and is returned to the proper level after the inputting of the signal is authorized.

9. The repeater as claimed in claim 1, wherein the detection part is configured to transmit an optical control signal to the preceding repeater, the optical control signal indicating that an inputting of the prohibited channel is to be prevented.

10. The repeater as claimed in claim 9, wherein the detection part is configured to identify the preceding repeater as passing the prohibited channel among a plurality of preceding repeaters, and to transmit the optical control signal to the identified preceding repeater.

11. The repeater as claimed in claim 1, further comprising:
    an insertion part configured to insert a channel into the optical signal to be transmitted from the repeater, wherein the insertion part is prevented from inserting the prohibited channel into the optical signal to be transmitted from the repeater.

12. A method for repeating an optical signal transmitted by wavelength division multiplexing, the method comprising:

receiving an optical signal from a preceding first repeater by a second repeater in a path from a source to a destination;

determining a channel allocation of a plurality of channels in the signal received by the second repeater by determining a bit rate and a modulation technique with respect to each of the plural channels in the received signal; and detecting a prohibited channel not to be included in the optical signal to be transmitted from the second repeater, based on the channel allocation of the plural channels and a predetermined criterion regarding the channel allocation of the plural channels, wherein said determining determines the bit rate and the modulation technique based on optical spectrum information obtained by analyzing a spectrum of the optical signal received from the preceding first repeater.

13. The method as claimed in claim 12, further comprising:

inserting a channel into the optical signal to be transmitted from the second repeater, wherein said inserting is prevented from inserting the prohibited channel into the optical signal to be transmitted from the second repeater.

* * * * *